(12) United States Patent
Lei et al.

(10) Patent No.: US 7,756,214 B2
(45) Date of Patent: Jul. 13, 2010

(54) SYSTEM AND METHOD FOR INSERTING PILOT SYMBOLS IN CONTINUOUS PHASE MODULATION SYSTEMS

(75) Inventors: Xiao Lei, Mishawaka, IN (US); Kevin G. Doberstein, Elmhurst, IL (US); Bradley M. Hiben, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 728 days.

(21) Appl. No.: 11/620,798

(22) Filed: Jan. 8, 2007

(65) Prior Publication Data
US 2008/0165886 A1 Jul. 10, 2008

(51) Int. Cl.
H04L 27/04 (2006.01)
(52) U.S. Cl. ...................................... 375/295
(58) Field of Classification Search ................ 375/295, 375/298, 284, 259, 347; 455/450, 452.2; 370/208, 328
See application file for complete search history.

(56) References Cited

U.S. PATENT DOCUMENTS

| 5,414,734 | A | 5/1995 | Marchetto |
| 5,712,877 | A | 1/1998 | Ho |
| 2002/0057661 | A1 | 5/2002 | Raith |
| 2003/0211851 | A1* | 11/2003 | Moon et al. .................. 455/450 |
| 2005/0250450 | A1 | 11/2005 | Olds |
| 2006/0007949 | A1 | 1/2006 | Okumura |
| 2006/0007994 | A1* | 1/2006 | Lai et al. ..................... 375/227 |
| 2006/0109938 | A1* | 5/2006 | Challa et al. ................ 375/347 |
| 2006/0194548 | A1 | 8/2006 | Nagaraj |
| 2006/0262876 | A1 | 11/2006 | LaDue |

* cited by examiner

*Primary Examiner*—Khai Tran
(74) *Attorney, Agent, or Firm*—Terri S. Hughes; Valerie M. Davis

(57) ABSTRACT

A system and method for creating a number of phase reference points in a data frame is provided. When a sequence of data bits is to be transmitted, the sequence is precoded into data symbols and organized as data frames. For each data frame, an x number of phase reference points at predetermined intervals within the data frame are required to allow a receiver to sufficiently estimate channel effects on the transmitted data frame. To set the phase reference points, one of the phase reference points is first selected. An x-1 number of pilot symbol sets are then created and inserted into the data frame such that each of the other reference points has the same phase state as the selected phase reference point.

20 Claims, 2 Drawing Sheets

SYSTEM AND METHOD FOR INSERTING PILOT SYMBOLS IN CONTINUOUS PHASE MODULATION SYSTEMS

TECHNICAL FIELD OF THE DISCLOSURE

This disclosure relates generally to continuous phase modulation systems, and more particularly, to a system and method for inserting pilot symbols in continuous phase modulation systems.

BACKGROUND OF THE DISCLOSURE

In mobile communication systems, coherent demodulation is often used for data communications between transmitting and receiving devices. Such systems, however, are susceptible to the effects of fading in the communication channel, which causes distortion of the amplitude and carrier phase of the transmitted signal. To compensate for these effects, mobile communication systems using coherent demodulation typically use pilot symbols that are embedded within the transmitted signal. Particularly, the transmitting device inserts the pilot symbols into a data stream at regular intervals to provide known amplitude and phase reference points. The intervals at which the pilot symbols are placed are related to the rate of the fading that is desired to be estimated. The receiving device uses the pilot symbols to estimate the effects of the channel on the carrier phase and/or amplitude of the transmitted signal. Based on these estimated effects, the receiving device is then synchronized to the carrier phase of the transmitted signal.

One example of a coherent demodulation scheme is continuous phase modulation (CPM). In contrast to other coherent digital phase-modulation techniques where the carrier phase at the start of every symbol is not dependent on any previously transmitted symbols, the carrier phase in CPM at the start of each symbol is determined by the cumulative total phase of all previously transmitted symbols, which is known as the phase memory.

A typical method for using pilot symbols to estimate channel effects in a CPM system is taught by Ho et al. in U.S. Pat. No. 7,712,877, and is incorporated herein by reference. In particular, Ho et al. describes a method for generating and inserting data-dependent pilot symbols in a CPM system. However, the overhead used by the inclusion of such pilot symbols significantly reduces the amount of data that can be transmitted within a single data frame. This is particularly problematic in low bandwidth modulations.

Accordingly, there is a need for a system and method for reducing the number of pilot symbols inserted within a data frame while still providing sufficient estimation of channel effects.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for creating a number of phase reference points in a data frame. When a sequence of data bits is to be transmitted, the sequence is precoded into data symbols and organized as data frames. For each data frame, an x number of phase reference points at predetermined intervals within the data frame are required to allow a receiver to sufficiently estimate channel effects on the transmitted data frame. To set the phase reference points, one of the phase reference points is first selected. An x-1 number of pilot symbol sets are then created and inserted into the data frame such that each of the other reference points has the same phase state as the selected phase reference point. Thus, an x number of phase reference points is created using only an x-1 number of pilot symbol sets.

Figure 1:
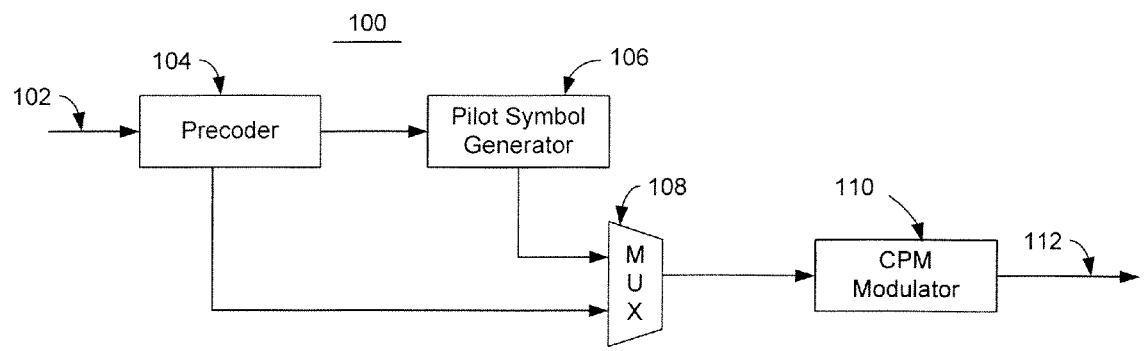
FIG. 1 shows one embodiment of a CPM transmitter in accordance with the present disclosure.
Figure 2:
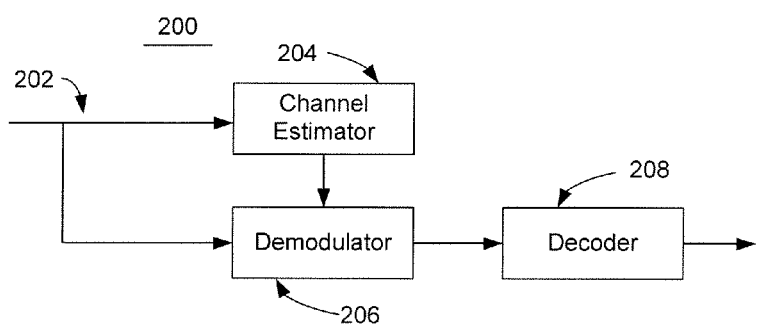
FIG. 2 shows one embodiment of a CPM receiver in accordance with the present disclosure.

Let us now discuss the present disclosure in greater detail by referring to the figures below. FIGS. 1 and 2 illustrate a CPM system in accordance with the present disclosure. More specifically, FIG. 1 illustrates one embodiment of a transmitting device while FIG. 2 illustrates one embodiment of a receiving device.

Turning to FIG. 1, the transmitting device 100 includes a precoder 104, a pilot symbol generator 106, a multiplexer 108 and a CPM modulator 110. The precoder 104 is configured to receive a sequence of input data 102. The precoder 104 maps the data bits of the received sequence into data symbols, and organizes the data symbols into frames. As would be understood by one skilled in the art, each of the data symbols is indicative of a phase change from one phase state to another, where the phase state is taken as modulo $2\pi$ and the specific available phase states are determined by the modulation index. For example, if the modulation index is $\frac{1}{2}$, the possible phase states are $0, \pi/2, \pi,$ and $3\pi/2$. In this example, each data symbol may then be indicative of a phase shift of $+\pi/2, -\pi/2, +3\pi/2$ or $-3\pi/2$.

Once the data bits for a given data frame have been encoded into data symbols, the data frame is provided to the pilot symbol generator 106. Based on the received data symbols for the data frame, the pilot symbol generator generates one or more sets of pilot symbols that are then added to the data frame using multiplexer 108 (either by inserting the pilot symbols between existing data symbols or by replacing existing data symbols with the pilot symbols). Similar to data symbols, each pilot symbol is indicative of a phase shift from one phase state to another, although the pilot symbols need not be limited to the same values as those of the data symbols. Each set of pilot symbols is chosen so as to create specific phase states at multiple phase reference points within the data frame that are known to the receiving device. The specific process for generating and inserting pilot words in accordance with the present disclosure will be discussed later.

The multiplexed signal is output from the multiplexer 108 to the CPM modulator 110, which performs the appropriate modulation scheme. The modulated signal 112 is then output from the CPM modulator 110 and sent over a communication channel which, for example, may have characteristics described by a Rayleigh fading model.

Turning to FIG. 2, the receiving device 200 includes a channel estimator 204, a demodulator 206, and a decoder 208. Upon receiving the transmitted signal 202, the channel estimator 204 estimates the effects of channel fading based on the expected phase state at the known phase reference points, and more particularly, based on the phase change between the various phase reference points within the data frame. The information regarding the effects of the channel is sent to the demodulator 206. This information is then exploited by the demodulator 206 during demodulation to compensate for any channel effects on the received data symbols (in phase and amplitude) on a symbol-by-symbol basis. The output from the demodulator is sent to the decoder 208, which undoes the mapping done by the precoder 104.

Figure 3:
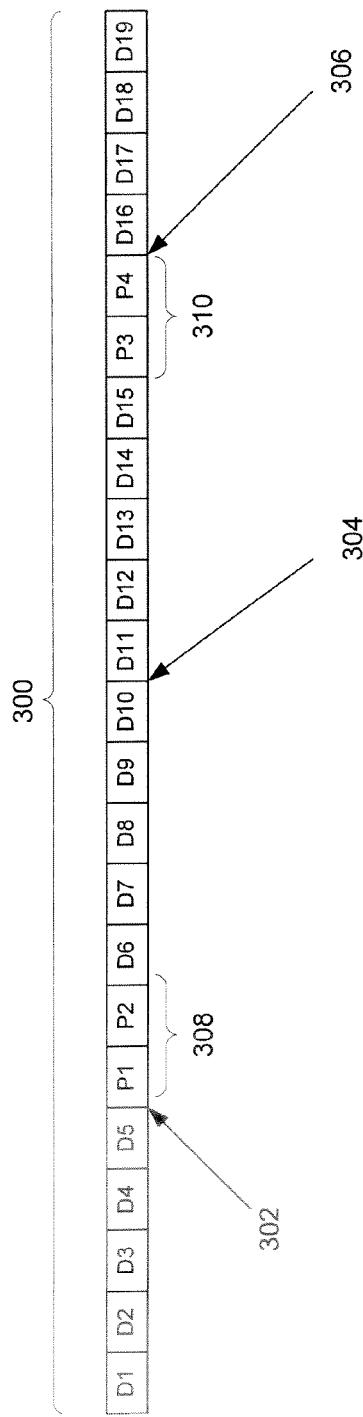
FIG. 3 shows a diagram of one embodiment of a method for inserting pilot symbols into a data frame with the present disclosure.
Figure 4:
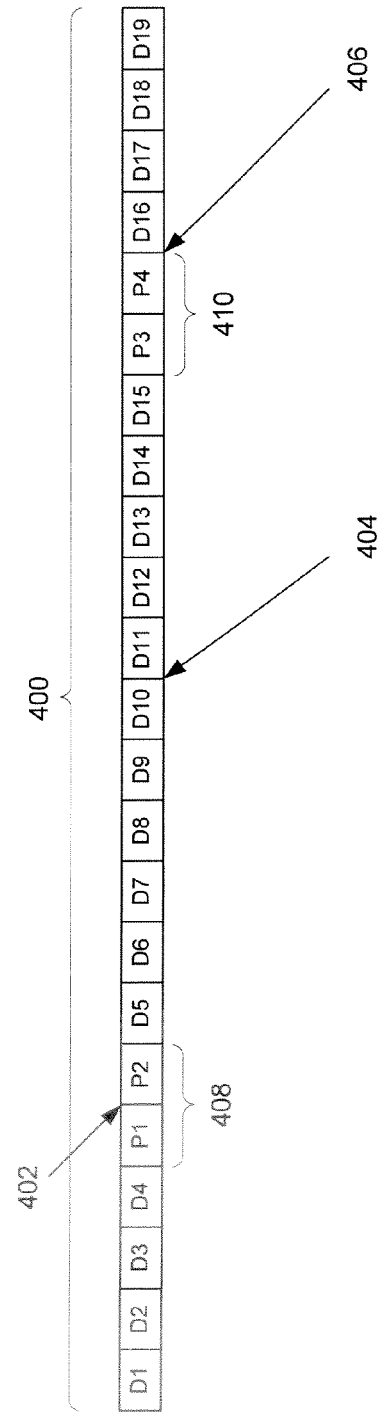
FIG. 4 shows a diagram of a second embodiment of a method for inserting pilot symbols into a data frame in accordance with the present disclosure.

FIGS. 3 and 4 illustrate two exemplary embodiments for generating and inserting pilot symbols within a data frame in accordance with the present disclosure. Referring first to FIG. 3, one embodiment of a method is illustrated for generating and inserting pilot symbols in a "full response" modulation scheme. In "full response" modulation schemes, the phase transition of a given symbol completes fully within a symbol period and therefore, the phase state of each symbol in the data frame is determined by the sum of all the previous data symbols in the frame. Thus, for "full response" modulation schemes, the phase state for a particular data symbol may be defined as:

$$\Phi(n) = \theta_0 + \sum_{k=0}^{n} S(k) \tag{1}$$

where $\Phi(n)$ is the phase at the $n^{th}$ symbol, $\theta_0$ is the initial phase for the data frame, and $S(k)$ is the phase change for the $k^{th}$ symbol.

As illustrated in FIG. 3, the data frame 300 is comprised of a sequence of symbols, where data symbols are identified using the prefix "D" and pilot symbols are identified using the prefix "P". In accordance with the present disclosure, an x number of phase reference points in the data frame are created using an x-1 number of pilot symbol sets. This is accomplished by selecting one of the x number of phase reference points in the data frame (also referred to herein as the "selected phase reference point") and inserting a set of pilot symbols for each of the remaining phase reference points, where the values for each set of pilot symbols is chosen to set the phase state of the remaining phase reference points equal to the selected phase reference point. As would be understood by one skilled in the art, the specific phase state of each of the phase reference points is not critical since channel effects can be estimated in CPM systems based solely on the expected phase shift between reference points. p In the embodiment of FIG. 3, the data frame 300 shown requires three phase reference points 302, 304, and 306. Here, two sets of pilot symbols 308 and 310 may be used to create the three phase reference points 302, 304, and 306. First, one of the three phase reference points 302, 304, and 306 is selected. In the example shown in FIG. 3, the selected phase reference point is phase reference point 304, which is located directly after data symbol D10. In accordance with the present disclosure, no pilot symbols are associated with the selected phase reference point.

Once the selection is made, two sets of pilot symbols 308 and 310 are generated and inserted into the data frame 300, where each set of pilot symbols 308 and 310 is associated with one of the non-selected phase reference points 302 and 306, respectively. More specifically, a first set of pilot symbols 308 is inserted within the data frame 300 immediately following the location of phase reference point 302. In the illustrated embodiment, the first set of pilot symbols 308 is comprised of two pilot symbols P1 and P2. However, as is well-known in the art, the number of pilot symbols associated with each phase reference point may be altered depending on the configuration of the system and the modulation index being used in order to ensure that each phase reference point can be set to any one of the available phase states for that phase reference point. Thus, each set of pilot symbols may also be comprised of only one pilot symbol, or more than two pilot symbols.

In accordance with the present disclosure, the values for pilot symbols P1 and P2 are chosen such that the phase state at phase reference point 302 is equal to the phase state of the selected reference point 304. This is accomplished by setting the sum of the pilot symbols and the data symbols between phase reference points 302 and 304 to be equal to zero when taken modulo $2\pi$. More precisely, the values of P1 and P2 are chosen to satisfy the following equation:

$$\text{MOD}(P1+P2+D6+D7+D8+D9+D10, 2\pi)=0 \tag{2}$$

Similarly, a second set of pilot symbols 310 is inserted within the data frame 300 immediately preceding phase reference point 306. As illustrated in FIG. 3, the second set of pilot symbols 310 is comprised of pilot symbols P3 and P4. The values for pilot symbols P3 and P4 are chosen such that the phase state at phase reference point 306 is equal to the phase state of the selected phase reference point 304. Again, this is done by setting the sum of the pilot symbols and data symbols between the phase reference points 304 and 306 equal to zero when taken modulo $2\pi$. Thus, the values of pilot symbols P3 and P4 are chosen to satisfy the following equation:

$$\text{MOD}(D11+D12+D13+D14+D15+P3+P4, 2\pi)=0 \tag{3}$$

By setting the pilot symbols in the above-described manner, all three phase reference points 302, 304, and 306 are set to the same phase state using only two sets of pilot symbols.

Of course, while one exemplary embodiment of a data frame 300 is illustrated, it is understood that the data frame may include a different number of data symbols. The data frame 300 may also contain only two phase reference points or more than three reference points. In an embodiment having more than three phase reference points, each of the additional phase reference points may similarly each be associated with a set of pilot symbols calculated to set each additional phase reference point the same phase state.

Each set of pilot symbols may also be inserted at a different location within the data frame so long as each set of pilot symbols is positioned between the selected phase reference point and the phase reference point associated with the set of pilot symbols. One exemplary process for inserting pilot symbols at positions other than at the reference points is described in a copending application of the inventors entitled "System and Method for Setting Phase Reference Points in Continuous Phase Modulation Systems by Providing Pilot Symbols at a Location Other Than the Location of the Phase Reference Point", Ser. No. 11/620,846, which is incorporated by reference herein. For example, with reference to the data frame 300 illustrated in FIG. 3, the first set of pilot symbols 308, which is associated with phase reference point 302, may be positioned after data symbols D6, D7, D8 or D9 without altering the calculation for the values of P1 and P2. Similarly, the second set of pilot symbols 310, which is associated with phase reference point 306, may also be positioned after data symbols D10, D11, D12, D13, or D14. Each of the pilot symbols within a set also need not be positioned directly next to one another. For example, pilot symbol P3 may be inserted after data symbol D12 while pilot symbol P4 is inserted after data symbol D15.

Turning to FIG. 4, one exemplary embodiment is illustrated for generating and inserting pilot symbols in a "partial response" modulation scheme. In "partial response" modulation schemes, the phase transition of a given symbol requires two or more full symbol periods. By way of example, for "partial response" modulation schemes that require two symbol periods to complete the phase shift for a given the symbol, the phase state for a particular data symbol may be defined as follows:

$$\Phi(n) = \theta_0 + \sum_{k=0}^{n-1} S(k) + \frac{1}{2}S(n) \quad (4)$$

where $\Phi(n)$ is the phase at the $n^{th}$ symbol, $\theta_0$ is the initial phase for the data frame, $S(k)$ is the phase change for the $k^{th}$ symbol, and $S(n)$ is the phase change for the $n^{th}$ symbol.

In FIG. 4, a data frame 400 is once again illustrated requiring three phase reference points 402, 404, and 406. Phase reference point 404 is chosen as the selected phase reference point, and two sets of pilot symbols 408 and 410 are generated and inserted into the data frame 400.

As shown in FIG. 4, the first set of pilot symbols 408 is comprised of pilot symbols P1 and P2. In this embodiment, pilot symbols P1 and P2 are inserted into the data frame 400 such that the phase reference point 402 is between pilot symbols P1 and P2. The values for pilot symbols P1 and P2 are chosen such that the phase state at phase reference point 402 is equal to the phase state of the selected reference point 404. For a "partial response" modulation scheme, this is accomplished by choosing the values of P1 and P2 to satisfy the following equation:

$$\text{MOD}(\tfrac{1}{2}*P1+P2+D5+D6+D7+D8+D9+\tfrac{1}{2}*D10, 2\pi)=0 \quad (5)$$

The second set of pilot symbols 410 is comprised of pilot symbols P3 and P4, which are inserted within the data frame 400 immediately preceding phase reference point 406. Again, the values for pilot symbols P3 and P4 are chosen such that the phase state at phase reference point 406 is equal to the phase state of the selected phase reference point 404. Thus, the values of pilot symbols P3 and P4 are chosen to satisfy the following equation:

$$\text{MOD}(\tfrac{1}{2}*D10+D11+D12+D13+D14+D15+P3+\tfrac{1}{2}*P4)=0 \quad (6)$$

Of course, as with the embodiment described in FIG. 3, the data frame 400 illustrated in FIG. 4 may also include any number of phase reference points and a different number of data symbols. Each set of pilot symbols may also be inserted at different locations within the data frame 400. However, unlike a "full response" modulation scheme where inserting a set of pilot symbols at a different location between the associated phase reference point and the selected phase reference point does not change the values of the pilot symbols, changing the location of a set of pilot symbols in a "partial response" modulation scheme may affect the values of the pilot symbols. For example, if pilot symbols P1 and P2 are inserted into data frame 400 immediately following data symbols D5 rather than D4, then P1 and P2 should be chosen to satisfy the following equation:

$$\text{MOD}(\tfrac{1}{2}*D5+P1+P2+D6+D7+D8+D9+\tfrac{1}{2}*D10, 2\pi)=0 \quad (7)$$

By means of the aforementioned disclosure, an x number of phase reference points can be set using only an x-1 number of pilot symbol sets. This reduces the amount of overhead required for the use of pilot symbols, thus enabling more data symbol to be transmitted per frame.

In addition to decreasing the amount of overhead required for pilot symbols in a data frame, the present disclosure may also be used to ensure that a pilot symbol is not positioned within a portion of a data frame where insertion of a pilot symbol would be undesirable. For example, in time division multiple access (TDMA) systems, data frame are generally structured as data bursts, each of which typically comprises an information field and a synchronization field within the center of the information field. In such TDMA systems, inserting data dependant pilot symbols within the synchronization field is generally undesirable as doing so prevents the synchronization field from being properly decoded. In the event that a phase reference point is required within the synchronization field, that phase reference point may be chosen as the "selected phase reference point", in which case phase reference points in the TDMA burst may be set to the same phase state as other phase reference points in the TDMA burst without inserting any pilot symbols within the synchronization field.

Further advantages and modifications of the above described system and method will readily occur to those skilled in the art. For example, while the embodiments described illustrate an x-1 number of pilot symbol sets calculated to ensure that each of the x number of phase reference points are set to the same phase state, it should be understood that each of the phase reference points may also be set to different phase states so long as the phase change from one reference point to another is known to the receiving device. For example, the pilot symbols may be calculated to force phase reference point to alternate between two phase states, to cycle through the available phase states, or any other pattern.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for transmitting digital information using a continuous phase modulation scheme, the method comprising:

obtaining a data frame requiring an x number of phase reference points to allow a receiving device to sufficiently estimate effects of a channel on the data frame during transmission;

generating an x-1 number of pilot symbol sets, each of the pilot symbol sets including at least one pilot symbol; and inserting the x-1 number of pilot symbol sets within the data frame, wherein the values of each pilot symbol in the x-1 number of pilot symbol sets is calculated to force each of the x number of phase reference points to a same phase state.

2. The method of claim 1 wherein each of the pilot symbols sets includes two pilot symbols.

3. The method of claim 1 wherein inserting the x-1 number of pilot symbol sets within the data frame includes inserting each pilot symbol set between a selected phase reference point and a phase reference point associated with the pilot symbol set, wherein the selected phase reference point is not associated with any of the x-1 number of pilot symbol sets.

4. The method of claim 1 wherein inserting the x-1 number of pilot symbol sets within the data frame includes inserting each pilot symbol set at a phase reference point associated with the pilot symbol set.

5. The method of claim 1 further including modulating the data frame using a full response modulation scheme.

6. The method of claim 1 further including modulating the data frame using a partial response modulation scheme.

7. A method for transmitting digital information using a continuous phase modulation scheme, the method comprising:

obtaining a data frame requiring a number of phase reference points to allow a receiving device to sufficiently estimate effects of a channel on the data frame during transmission;

selecting a first phase reference point in the data frame;

generating a set of pilot symbols for a second phase reference point in the data frame, the set of pilot symbols including at least one pilot symbol having a value calculated to set the second phase reference point to a certain phase state; and inserting the set of pilot symbols into the data frame, wherein the certain phase state is determined based on the phase state of the first phase reference point.

8. The method of claim 7 wherein each set of pilot symbols includes at least one pilot symbol having a value calculated to set the second phase reference point to a phase state that is the same as the phase state of the first phase reference point.

9. The method of claim 7 wherein the set of pilot symbols includes two pilot symbols, wherein values of the two pilot symbols are calculated so as to set the second phase reference point to a phase state that is the same as the phase state of the first phase reference point.

10. The method of claim 7 wherein inserting the set of pilot symbols within the data frame includes inserting at least a portion of the set of pilot symbols between the first phase reference point and the second phase reference point.

11. The method of claim 7 wherein inserting the set of pilot symbols within the data frame includes inserting the set of pilot symbols between the first phase reference point and the second phase reference point.

12. The method of claim 7 wherein inserting the set of pilot symbols within the data frame includes inserting the set of pilot symbols at the second phase reference point.

13. The method of claim 7 wherein the data frame is a time division multiple access (TDMA) burst and the first phase reference point is within a synchronization field of the TDMA burst.

14. The method of claim 7 wherein the value of the at least one pilot symbol is dependent upon the value of each data symbol between the at least one pilot symbol and the first phase reference point.

15. A system for communicating digital information using a continuous phase modulation scheme comprising:

a precoder for receiving a sequence of data bits, mapping the sequence of data bits into data symbols and organizing the data symbols into one or more data frames;

a pilot symbol generator for generating and inserting pilot symbols into each data frame such that each data frame includes an x number of phase reference points set to a phase state using an x-1 number of pilot symbol sets; and a continuous phase modulator for modulating and transmitting each data frame over a communication channel.

16. The system of claim 15 wherein the pilot symbol generator generates and inserts pilot symbols into each data frame such that each data frame includes an x number of phase reference points set to a same phase state using an x-1 number of pilot symbol sets.

17. The system of claim 15 wherein each pilot symbol set includes at least one pilot symbol.

18. The system of claim 15 wherein the pilot symbol generator inserts pilot symbols into each data frame via a multiplexer.

19. The system of claim 15 wherein the continuous phase modulator performs either a full response modulation scheme or a partial response modulation scheme.

20. The system of claim 15 further including:

a channel estimator for estimating channel phase distortion based on phase changes between the x number of phase reference points in a data frame received on the communication channel; and a demodulator for demodulating the data frame based on the estimated channel phase distortion.

* * * * *

UNITED STATES PATENT AND TRADEMARK OFFICE
CERTIFICATE OF CORRECTION

| | | |
|---|---|---|
| PATENT NO. | : 7,756,214 B2 | Page 1 of 1 |
| APPLICATION NO. | : 11/620798 | |
| DATED | : July 13, 2010 | |
| INVENTOR(S) | : Lei et al. | |

It is certified that error appears in the above-identified patent and that said Letters Patent is hereby corrected as shown below:

IN THE SPECIFICATION

1. In Column 3, Line 67, delete "points.p" and insert -- points. --, therefor.

2. In Columns 3 & 4, Lines 67 & 1-10, delete "In the embodiment of.....point." and insert the same in Column 4, Line 1, as new paragraph.

Signed and Sealed this
Nineteenth Day of June, 2012

David J. Kappos
*Director of the United States Patent and Trademark Office*